June 18, 1963  H. L. WILLIAMS  3,094,131
VEHICLE COOLING SYSTEM CLEANING APPARATUS
Filed April 11, 1961  2 Sheets-Sheet 1
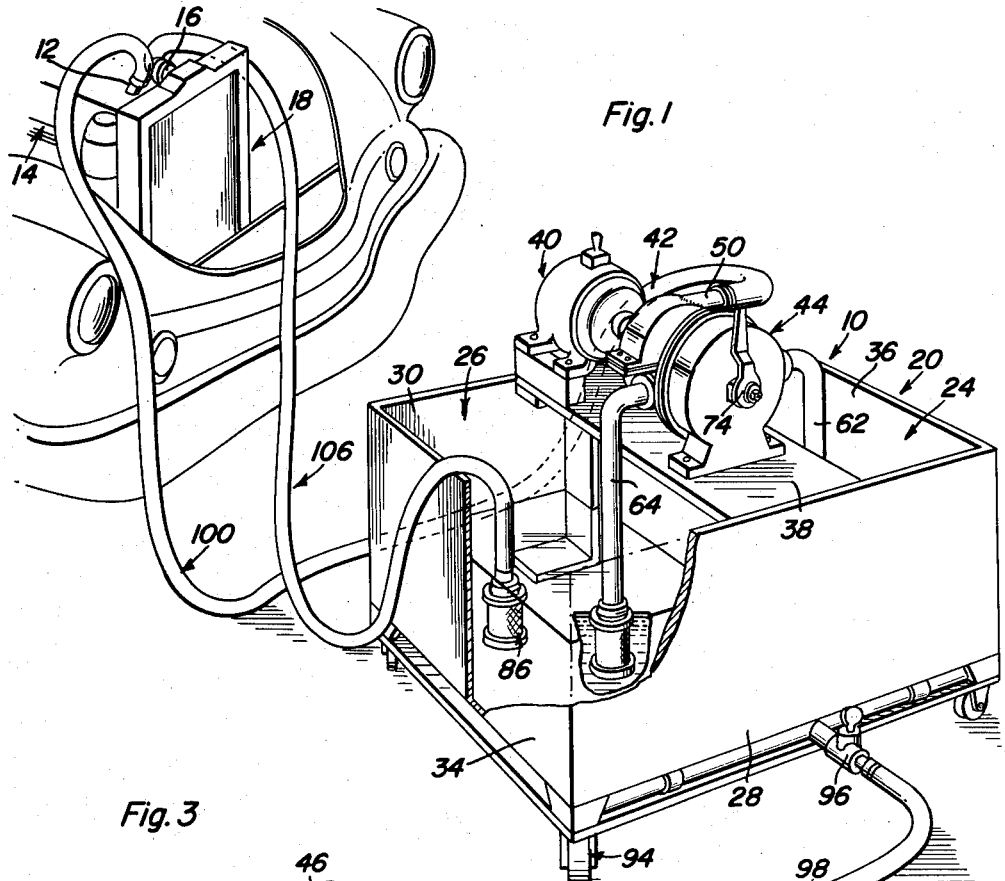
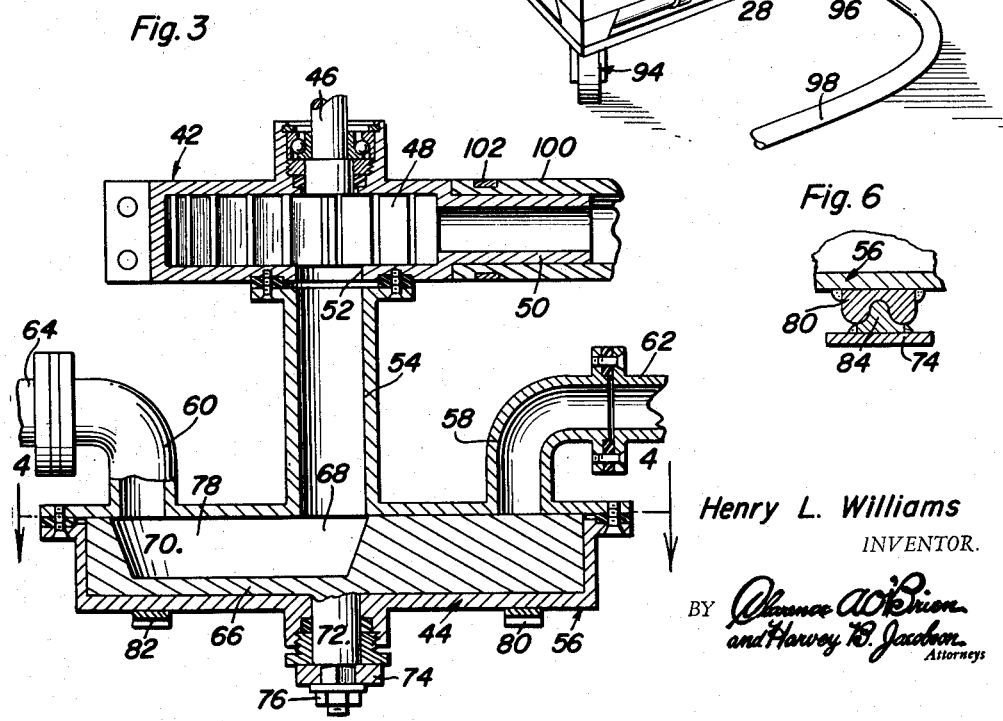
Henry L. Williams
INVENTOR.

June 18, 1963 H. L. WILLIAMS 3,094,131
VEHICLE COOLING SYSTEM CLEANING APPARATUS
Filed April 11, 1961 2 Sheets-Sheet 2

Henry L. Williams
INVENTOR.

BY
Attorneys

United States Patent Office 3,094,131
Patented June 18, 1963

3,094,131
VEHICLE COOLING SYSTEM CLEANING APPARATUS
Henry L. Williams, 401 W. Commerce St., Eastland, Tex.
Filed Apr. 11, 1961, Ser. No. 102,255
1 Claim. (Cl. 134—98)

This invention relates to a novel and useful cooling system cleaning apparatus specifically adapted for use in cleaning and flushing vehicle cooling systems of the type utilizing a radiator to assist in cooling the water jacketed internal combustion engine by which the vehicle is powered.

The vehicle cooling system of the instant invention utilizes an open top tank reservoir compartmented into separate cleaning and flushing fluid reservoirs. A pump means having an inlet and an outlet is provided and the pump means includes means for selectively communicating the inlet of the pump with the cleaning and flushing fluid reservoirs. The outlet of the pump is provided with an outlet line connected thereto at one end and means is provided on the other end of the outlet line for securement to a cooling fluid inlet or outlet neck of an internal combustion engine which is normally connected to an outlet or inlet neck of a radiator by means of a radiator hose. A separate return line has means on one end adapted for securement to the radiator neck normally connected to the engine cooling fluid neck to which the outlet line is connected and the opposite end of the return line may be selectively communicated with the cleaning and flushing fluid reservoirs whereby the fluid being circulated by the cleaning apparatus may be returned to the reservoir from which it is being pumped.

The main object of the invention is to provide a vehicle cooling system cleaning apparatus specifically designed to enable the reuse of cleaning and flushing fluids during cleaning operations performed on vehicle cooling systems.

A further object of this invention, in accordance with the immediately preceding object is to provide a cleaning apparatus which will enable the cooling system of a vehicle to be cleaned, flushed and neutralized in the shortest possible time in order that cooling systems may be properly conditioned before adding antifreeze in the fall and after the antifreeze has been removed.

Still another object of this invention is to provide a cooling system cleaning apparatus provided with simplified controls enabling first cleaning fluid and then flushing fluid to be circulated through the cooling system of a vehicle.

Still another object of this invention is to provide a cooling system cleaning apparatus which is substantially self-contained and is capable of cleaning a large number of vehicle cooling systems before the cleaning and flushing fluid must be renewed.

A final object to be specifically enumerated herein is to provide a vehicle cooling system cleaning apparatus which will conform to conventional forms of manufacture, be of simple construction and easy to operate so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the vehicle cooling system cleaning apparatus of the instant invention showing the manner in which it may be operatively connected to a vehicle cooling system, parts of the cooling system apparatus being broken away and shown in section;

FIGURE 3 is an enlarged fragmentary horizontal sectional view taken substantially upon the plane indicated by the section line 3—3 of FIGURE 2;

FIGURE 6 is an enlarged fragmentary sectional view illustrating the detent means by which the operating handle of the control valve may be frictionally retained in selected positions.

Figure 2:
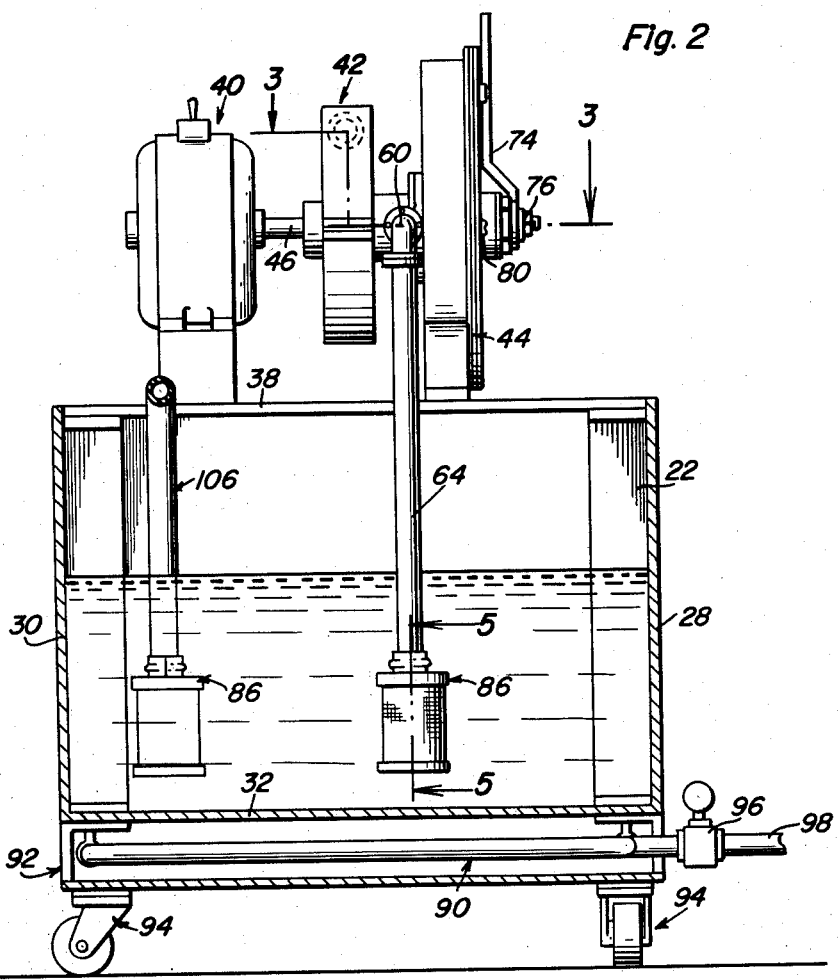
FIGURE 2 is a transverse vertical sectional view of the cooling system cleaning apparatus.
Figure 4:
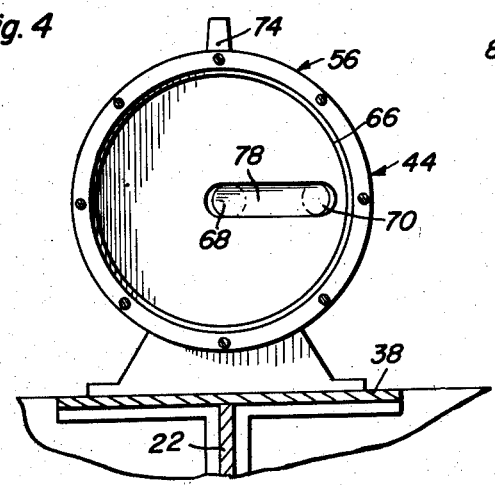
FIGURE 4 is a fragmentary vertical sectional view on somewhat of a reduced scale taken substantially upon the plane indicated by the section line 4—4 of FIGURE 3.

Referring now more specifically to the drawings the numeral 10 generally designates the cooling system cleaning apparatus of the instant invention which is shown in FIGURE 1 of the drawings operatively connected to the outlet neck 12 of the internal combustion engine generally designated by the reference numeral 14 and the inlet neck 16 of the radiator of the vehicle 14 which is generally designated by the reference numeral 18.

The cooling system apparatus includes a tank reservoir generally referred to by the reference numeral 20 which is provided with an upstanding partition wall 22 which divides the tank reservoir into a cleaning fluid reservoir generally designated by the reference numeral 24 and a flushing fluid reservoir generally referred to by the reference numeral 26. The partition 22 extends between the side walls 28 and 30 of the tank reservoir 20 and extends from the bottom wall 32 of the tank reservoir to a point spaced from the upper edges of the tank reservoir 20. The tank reservoir 20 also includes opposite end walls 34 and 36 and a transversely extending partial top wall 38 upon which an electric motor generally referred to by the reference numeral 40, a pump generally referred to by the reference numeral 42 and a control valve generally referred to by the reference numeral 44 is mounted.

Figure 5:
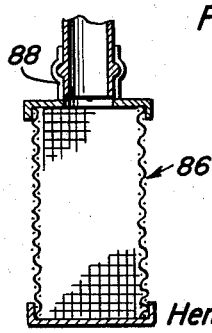
FIGURE 5 is an enlarged fragmentary vertical sectional view taken substantially upon the plane indicated by the section line 5—5 of FIGURE 2.

With attention now directed to FIGURE 3 of the drawings it will be noted that the output shaft 46 of the motor 40 is drivingly connected to the impeller 48 of the pump 42. Additionally, it may be observed that the pump 42 includes an outlet 50 and an inlet 52. The inlet 52 is communicated with the outlet 54 of the control valve generally referred to by the reference numeral 44. The control valve 44 includes a hollow casing generally referred to by the reference numeral 56 having a pair of inlets 58 and 60 to which branch conduits 62 and 64 are connected. The control valve includes a rotary valve member 66 having an outlet 68 and an inlet 70. The valve member is rotatably journalled by means of stub shaft 72 and a handle 74 is secured to the stub shaft 72 by means of a threaded fastener 76. It will be noted that the outlet 68 in the valve member 66 is located concentrically with the axis of rotation of the valve member 66 so that the outlet 68 is in constant communication with the outlet 54 of the control valve 44. The passage 78 in the valve member 66 having the outlet 68 on one end and the inlet 70 on the other end extends radially of the valve member 66 and the outlet 70 is registrable with the inlets 58 and 60 upon rotation of the stub shaft 72. The hollow casing 56 includes a pair of grooved stop elements 80 and 82 with which a detent 84 carried by the handle 74 may be engaged to frictionally retain the handle 74 in either of the limit positions established by the stops 80 and 82. The inlet or branch conduit 62 extends downwardly into the cleaning fluid reservoir 24 and the branch conduit 64 extends downwardly into the flushing fluid reservoir 26. Each of the branch conduits 62 and 64 is provided with a filter assembly generally referred to by the reference numeral 86 for preventing foreign material within the reservoirs 24 and 26 from entering the branch conduits 62 and 64 respectively. It will be observed, see FIGURE 5, that each of the filter assemblies 86 includes a clamp assembly 88 which removably secures the filter assembly 86 to the corresponding branch conduit.

A gas burner assembly generally referred to by the reference numeral 90 is disposed beneath the bottom wall 32 and is utilized to heat the cleaning and flushing fluid disposed within the reservoirs 24 and 26. The tank reservoir includes a supporting frame generally referred to by the reference numeral 92 and the supporting frame is provided with caster wheel supporting assemblies generally referred to by the reference numeral 94. The gas burner assembly 90 is provided with a control valve 96 to which a gas supply line 98 is operatively connected. It will be noted that the gas supply line 98 is flexible in order that the tank reservoir may be moved about as desired within the limits of the reach of the gas line 98.

The cleaning apparatus 10 also includes an outlet line generally referred to by the reference numeral 100 which has one end connected to the outlet 50 by means of a clamp 102. The other end of the outlet line 100 is connected to the neck 12 of the internal combustion engine 14 in any convenient manner and the apparatus 10 also includes a fluid return line generally referred to by the reference numeral 106 which is connected at one end to the neck 16 of the radiator 18 and also is provided with a filter assembly 86 on its other end. The outlet and return lines 100 and 106 are flexible and it will be noted that the outlet end of the return line 106 may be readily moved from a position communicated with the cleaning fluid reservoir 24 to a position communicated with the flushing fluid reservoir 26.

In operation, the gas burner assembly 90 may be actuated to heat both the cleaning and flushing fluids and the outlet return lines 100 and 106 may be operatively connected to the internal combustion engine 14 and radiator 18 as illustrated in FIGURE 1 of the drawings. Then, the handle 74 may be actuated to communicate the branch conduit 62 with the pump 42 in order that cleaning fluid may be circulated through the internal combustion engine 14, upwardly through the radiator 18 and returned to the cleaning fluid reservoir 24 by means of the return line 106. The circulation of the cleaning fluid may be as long as desired and when the flushing with cleaning fluid has been completed the control valve handle 74 may be manipulated to communicate the branch conduit 64 with the pump 42 until all of the cleaning fluid has been forced through the apparatus 10, the internal combustion engine 14 and the radiator 18. Then, the motor 40 is stopped and the return line 106 is removed from the reservoir 26 and its filter assembly 86 is cleaned. Then, the free end of the return line 106 is positioned in the reservoir 24 whereupon the motor 40 may again be started to flush the cooling system with flushing fluid such as water.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A vehicle cooling system cleaning apparatus comprising an open top tank reservoir compartmented into separate cleaning and flushing fluid reservoirs by a vertically extending partition wall completely segregating said reservoirs from each other, a pump having an inlet and an outlet, two branch conduits each having one end thereof in communication with the cleaning and flushing fluid reservoirs, a control valve, the other end of said two branch conduits being in communication with said control valve, said control valve having a movable valve member with an inlet selectively registrable with said branch conduits, and an outlet in constant registry with said pump inlet, a free flow outlet line having one end communicated with said pump outlet and the other end thereof adapted for securement to a cooling fluid inlet or outlet neck of an internal combustion engine normally connected to an outlet or inlet neck of radiator by means of a radiator hose, and a gravity flow return line having means on one end adapted for securement to the radiator neck normally connected to the engine cooling fluid neck with which said outlet line is connected, said free end of said return line being manually selectively positionable in communication with either the cleaning fluid reservoir or the flushing fluid reservoir through the open tops thereof.

References Cited in the file of this patent

UNITED STATES PATENTS

| | | |
|---|---|---|
| 659,365 | De Waldo | Oct. 9, 1900 |
| 1,633,669 | Irvin | June 28, 1927 |
| 1,741,329 | Montgomery | Dec. 31, 1929 |
| 1,756,410 | Wertz | Apr. 29, 1930 |
| 2,169,620 | Spayd | Aug. 15, 1939 |
| 2,187,413 | Boezi | Jan. 16, 1940 |
| 2,222,516 | Powell | Nov. 19, 1940 |
| 2,471,506 | Wiswall | May 31, 1949 |
| 2,570,021 | Beach | Oct. 2, 1951 |
| 2,809,650 | Anderson | Oct. 15, 1957 |